US009438992B2

(12) United States Patent
Every et al.

(10) Patent No.: US 9,438,992 B2
(45) **Date of Patent: *Sep. 6, 2016**

(54) MULTI-MICROPHONE ROBUST NOISE SUPPRESSION

(71) Applicant: Knowles Electronics, LLC, Itasca, IL (US)

(72) Inventors: Mark Every, Surrey (CA); Carlos Avendano, Campbell, CA (US); Ludger Solbach, San Jose, CA (US); Ye Jiang, San Diego, CA (US); Carlo Murgia, Sunnyvale, CA (US)

(73) Assignee: Knowles Electronics, LLC, Itasca, IL (US)

(*) Notice: Subject to any disclaimer, the term of this patent is extended or adjusted under 35 U.S.C. 154(b) by 200 days.

This patent is subject to a terminal disclaimer.

(21) Appl. No.: 13/959,457

(22) Filed: Aug. 5, 2013

(65) Prior Publication Data

US 2013/0322643 A1 Dec. 5, 2013

Related U.S. Application Data

(63) Continuation of application No. 12/832,920, filed on Jul. 8, 2010, now Pat. No. 8,538,035.

(60) Provisional application No. 61/329,322, filed on Apr. 29, 2010.

(51) Int. Cl.
*H04B 3/20* (2006.01)
*H04R 3/00* (2006.01)
(Continued)

(52) U.S. Cl.
CPC ........... *H04R 3/002* (2013.01); *G10L 21/0208* (2013.01); *G10L 21/0232* (2013.01); *G10L 2021/02082* (2013.01); *G10L 2021/02166* (2013.01)

(58) Field of Classification Search
CPC ................ G10L 21/0208; G10L 2021/02082; G10L 2021/02165; G10L 21/0232; H04B 3/20; H04M 9/082
USPC ...... 381/94.1–94.9, 92, 66, 83, 93; 704/226, 704/233
See application file for complete search history.

(56) References Cited

U.S. PATENT DOCUMENTS 3,517,223 A 6/1970 Gaunt et al.
3,989,897 A 11/1976 Carver
(Continued)

FOREIGN PATENT DOCUMENTS

JP 2008065090 3/2008
TW 200933609 8/2009
(Continued)

OTHER PUBLICATIONS

Non-Final, May 14, 2012, U.S. Appl. No. 12/832,901, filed Jul. 8, 2010.
(Continued)

*Primary Examiner* — Disler Paul
(74) *Attorney, Agent, or Firm* — Carr & Ferrell LLP

(57) ABSTRACT

A robust noise reduction system may concurrently reduce noise and echo components in an acoustic signal while limiting the level of speech distortion. The system may receive acoustic signals from two or more microphones in a close-talk, hand-held or other configuration. The received acoustic signals are transformed to frequency domain sub-band signals and echo and noise components may be subtracted from the sub-band signals. Features in the acoustic sub-band signals are identified and used to generate a multiplicative mask. The multiplicative mask is applied to the noise subtracted sub-band signals and the sub-band signals are reconstructed in the time domain.

18 Claims, 5 Drawing Sheets

(51) Int. Cl.

*G10L 21/0232* (2013.01)

*G10L 21/0208* (2013.01)

*G10L 21/0216* (2013.01)

(56) References Cited

U.S. PATENT DOCUMENTS 4,811,404 A 3/1989 Vilmur et al.
4,910,779 A 3/1990 Cooper et al.
5,012,519 A 4/1991 Adlersberg et al.
5,027,306 A 6/1991 Dattorro et al.
5,050,217 A 9/1991 Orban
5,103,229 A 4/1992 Ribner
5,335,312 A 8/1994 Mekata et al.
5,408,235 A 4/1995 Doyle et al.
5,473,702 A 12/1995 Yoshida et al.
5,687,104 A 11/1997 Lane et al.
5,701,350 A 12/1997 Popovich
5,774,562 A 6/1998 Furuya et al.
5,796,850 A 8/1998 Shiono et al.
5,806,025 A 9/1998 Vis et al.
5,828,997 A 10/1998 Durlach et al.
5,917,921 A 6/1999 Sasaki et al.
5,950,153 A 9/1999 Ohmori et al.
5,963,651 A 10/1999 Van Veen et al.
5,974,379 A 10/1999 Hatanaka et al.
6,011,501 A 1/2000 Gong et al.
6,104,993 A 8/2000 Ashley
6,138,101 A 10/2000 Fujii
6,160,265 A 12/2000 Bacchi et al.
6,240,386 B1 5/2001 Thyssen et al.
6,289,311 B1 9/2001 Omori et al.
6,326,912 B1 12/2001 Fujimori
6,343,267 B1 1/2002 Kuhn et al.
6,377,637 B1 4/2002 Berdugo
6,377,915 B1 4/2002 Sasaki
6,381,570 B2 4/2002 Li et al.
6,453,284 B1 9/2002 Paschall
6,480,610 B1 11/2002 Fang et al.
6,483,923 B1 11/2002 Marash
6,490,556 B1 12/2002 Graumann et al.
6,539,355 B1 3/2003 Omori et al.
6,594,367 B1 7/2003 Marash et al.
6,757,395 B1 6/2004 Fang et al.
6,876,859 B2 4/2005 Anderson et al.
6,895,375 B2 5/2005 Malah et al.
7,054,808 B2 * 5/2006 Yoshida ........................ 704/226
7,054,809 B1 5/2006 Gao
7,065,486 B1 6/2006 Thyssen
7,072,834 B2 7/2006 Zhou
7,110,554 B2 9/2006 Brennan et al.
7,245,767 B2 7/2007 Moreno et al.
7,254,535 B2 8/2007 Kushner et al.
7,257,231 B1 8/2007 Avendano et al.
7,283,956 B2 10/2007 Ashley et al.
7,343,282 B2 3/2008 Kirla et al.
7,346,176 B1 3/2008 Bernardi et al.
7,373,293 B2 5/2008 Chang et al.
7,379,866 B2 5/2008 Gao
7,461,003 B1 12/2008 Tanrikulu
7,472,059 B2 12/2008 Huang
7,516,067 B2 4/2009 Seltzer et al.
7,539,273 B2 5/2009 Struckman
7,546,237 B2 6/2009 Nongpiur et al.
7,574,352 B2 8/2009 Quatieri, Jr.
7,590,250 B2 9/2009 Ellis et al.
7,657,427 B2 2/2010 Jelinek
7,664,640 B2 2/2010 Webber
7,672,693 B2 3/2010 Kallio et al.
7,725,314 B2 5/2010 Wu et al.
7,769,187 B1 8/2010 Farrar et al.
7,792,680 B2 9/2010 Iser et al.
7,813,931 B2 10/2010 Hetherington et al.
7,873,114 B2 1/2011 Lin
7,925,502 B2 4/2011 Droppo et al.
7,957,542 B2 6/2011 Sarrukh et al.
7,986,794 B2 7/2011 Zhang
8,005,238 B2 8/2011 Tashev et al.
8,032,369 B2 10/2011 Manjunath et al.
8,046,219 B2 10/2011 Zurek et al.
8,060,363 B2 11/2011 Ramo et al.
8,078,474 B2 12/2011 Vos et al.
8,098,844 B2 1/2012 Elko
8,107,631 B2 1/2012 Merimaa et al.
8,107,656 B2 1/2012 Dreβler et al.
8,111,843 B2 2/2012 Logalbo et al.
8,112,272 B2 2/2012 Nagahama et al.
8,112,284 B2 2/2012 Kjorling et al.
8,140,331 B2 3/2012 Lou
8,155,346 B2 4/2012 Yoshizawa et al.
8,160,262 B2 4/2012 Buck et al.
8,160,265 B2 4/2012 Mao et al.
8,170,221 B2 5/2012 Christoph
8,180,062 B2 5/2012 Turku et al.
8,180,069 B2 * 5/2012 Buck ...................... H04R 3/005 381/92
8,184,822 B2 5/2012 Carreras et al.
8,184,823 B2 5/2012 Itabashi et al.
8,190,429 B2 5/2012 Iser et al.
8,195,454 B2 6/2012 Muesch
8,204,253 B1 6/2012 Solbach
8,223,988 B2 7/2012 Wang et al.
8,249,861 B2 8/2012 Li et al.
8,271,292 B2 9/2012 Osada et al.
8,275,610 B2 9/2012 Faller et al.
8,280,730 B2 10/2012 Song et al.
8,311,817 B2 11/2012 Murgia et al.
8,359,195 B2 1/2013 Li
8,363,850 B2 1/2013 Amada
8,411,872 B2 4/2013 Stothers et al.
8,433,074 B2 * 4/2013 Hoshuyama ............. 379/406.01
8,438,026 B2 5/2013 Fischer et al.
8,447,045 B1 5/2013 Laroche
8,447,596 B2 5/2013 Avendano et al.
8,473,285 B2 6/2013 Every et al.
8,473,287 B2 6/2013 Every et al.
8,526,628 B1 9/2013 Massie et al.
8,538,035 B2 9/2013 Every et al.
8,606,571 B1 12/2013 Every et al.
8,611,551 B1 12/2013 Massie et al.
8,611,552 B1 12/2013 Murgia et al.
8,682,006 B1 3/2014 Laroche et al.
8,700,391 B1 4/2014 Avendano et al.
8,761,410 B1 6/2014 Avendano et al.
8,781,137 B1 7/2014 Goodwin
8,848,935 B1 9/2014 Massie et al.
8,958,572 B1 2/2015 Solbach
9,008,329 B1 4/2015 Mandel et al.
9,143,857 B2 9/2015 Every et al.
2001/0041976 A1 11/2001 Taniguchi et al.
2001/0044719 A1 11/2001 Casey
2001/0046304 A1 11/2001 Rast
2002/0036578 A1 3/2002 Reefman
2002/0052734 A1 5/2002 Unno et al.
2002/0097884 A1 7/2002 Cairns
2002/0128839 A1 9/2002 Lindgren et al.
2002/0194159 A1 12/2002 Kamath et al.
2003/0093278 A1 5/2003 Malah
2003/0162562 A1 8/2003 Curtiss et al.
2004/0047474 A1 3/2004 Vries et al.
2004/0153313 A1 8/2004 Aubauer et al.
2005/0049857 A1 3/2005 Seltzer et al.
2005/0069162 A1 3/2005 Haykin et al.
2005/0075866 A1 4/2005 Widrow
2005/0207583 A1 9/2005 Christoph
2005/0238238 A1 10/2005 Xu et al.
2005/0266894 A9 12/2005 Rankin
2005/0267741 A1 12/2005 Laaksonen et al.
2006/0074693 A1 4/2006 Yamashita
2006/0089836 A1 4/2006 Boillot et al.
2006/0116175 A1 6/2006 Chu
2006/0116874 A1 6/2006 Samuelsson et al.
2006/0165202 A1 7/2006 Thomas et al.
2006/0247922 A1 11/2006 Hetherington et al.
2007/0005351 A1 1/2007 Sathyendra et al.

(56) References Cited

U.S. PATENT DOCUMENTS

| | | | |
|---|---|---|---|
| 2007/0038440 | A1 | 2/2007 | Sung et al. |
| 2007/0041589 | A1 | 2/2007 | Patel et al. |
| 2007/0053522 | A1 | 3/2007 | Murray et al. |
| 2007/0055508 | A1 | 3/2007 | Zhao et al. |
| 2007/0076896 | A1 | 4/2007 | Hosaka et al. |
| 2007/0088544 | A1 | 4/2007 | Acero et al. |
| 2007/0154031 | A1 | 7/2007 | Avendano et al. |
| 2007/0253574 | A1 | 11/2007 | Soulodre |
| 2007/0299655 | A1 | 12/2007 | Laaksonen et al. |
| 2008/0019548 | A1* | 1/2008 | Avendano ..................... 381/313 |
| 2008/0147397 | A1 | 6/2008 | Konig et al. |
| 2008/0159573 | A1 | 7/2008 | Dressler et al. |
| 2008/0170716 | A1 | 7/2008 | Zhang |
| 2008/0186218 | A1 | 8/2008 | Ohkuri et al. |
| 2008/0187148 | A1 | 8/2008 | Itabashi et al. |
| 2008/0208575 | A1 | 8/2008 | Laaksonen et al. |
| 2008/0215344 | A1 | 9/2008 | Song et al. |
| 2008/0228474 | A1 | 9/2008 | Huang et al. |
| 2008/0232607 | A1 | 9/2008 | Tashev et al. |
| 2008/0317261 | A1 | 12/2008 | Yoshida et al. |
| 2009/0012783 | A1 | 1/2009 | Klein |
| 2009/0022335 | A1 | 1/2009 | Konchitsky et al. |
| 2009/0043570 | A1 | 2/2009 | Fukuda et al. |
| 2009/0067642 | A1* | 3/2009 | Buck et al. .................. 381/94.1 |
| 2009/0086986 | A1 | 4/2009 | Schmidt et al. |
| 2009/0095804 | A1 | 4/2009 | Agevik et al. |
| 2009/0112579 | A1 | 4/2009 | Li et al. |
| 2009/0119096 | A1 | 5/2009 | Gerl et al. |
| 2009/0129610 | A1 | 5/2009 | Kim et al. |
| 2009/0150144 | A1 | 6/2009 | Nongpiur et al. |
| 2009/0164212 | A1 | 6/2009 | Chan et al. |
| 2009/0175466 | A1 | 7/2009 | Elko et al. |
| 2009/0216526 | A1 | 8/2009 | Schmidt et al. |
| 2009/0220107 | A1 | 9/2009 | Every et al. |
| 2009/0228272 | A1 | 9/2009 | Herbig et al. |
| 2009/0238373 | A1 | 9/2009 | Klein |
| 2009/0248403 | A1 | 10/2009 | Kinoshita et al. |
| 2009/0287481 | A1 | 11/2009 | Paranjpe et al. |
| 2009/0287496 | A1 | 11/2009 | Thyssen et al. |
| 2009/0299742 | A1 | 12/2009 | Toman et al. |
| 2009/0304203 | A1 | 12/2009 | Haykin et al. |
| 2009/0315708 | A1 | 12/2009 | Walley et al. |
| 2009/0323982 | A1 | 12/2009 | Solbach et al. |
| 2010/0063807 | A1 | 3/2010 | Archibald et al. |
| 2010/0067710 | A1 | 3/2010 | Hendriks et al. |
| 2010/0076756 | A1 | 3/2010 | Douglas et al. |
| 2010/0076769 | A1 | 3/2010 | Yu |
| 2010/0082339 | A1 | 4/2010 | Konchitsky et al. |
| 2010/0087220 | A1 | 4/2010 | Zheng et al. |
| 2010/0094622 | A1 | 4/2010 | Cardillo et al. |
| 2010/0103776 | A1 | 4/2010 | Chan |
| 2010/0158267 | A1 | 6/2010 | Thormundsson et al. |
| 2010/0198593 | A1 | 8/2010 | Yu |
| 2010/0208908 | A1* | 8/2010 | Hoshuyama .................... 381/66 |
| 2010/0223054 | A1 | 9/2010 | Nemer et al. |
| 2010/0272275 | A1 | 10/2010 | Carreras et al. |
| 2010/0272276 | A1 | 10/2010 | Carreras et al. |
| 2010/0282045 | A1 | 11/2010 | Chen et al. |
| 2010/0290636 | A1 | 11/2010 | Mao et al. |
| 2011/0007907 | A1 | 1/2011 | Park et al. |
| 2011/0019838 | A1 | 1/2011 | Kaulberg et al. |
| 2011/0026734 | A1 | 2/2011 | Hetherington et al. |
| 2011/0038489 | A1 | 2/2011 | Visser et al. |
| 2011/0081026 | A1 | 4/2011 | Ramakrishnan et al. |
| 2011/0099010 | A1 | 4/2011 | Zhang |
| 2011/0099298 | A1 | 4/2011 | Chadbourne et al. |
| 2011/0103626 | A1 | 5/2011 | Bisgaard et al. |
| 2011/0137646 | A1 | 6/2011 | Ahgren et al. |
| 2011/0158419 | A1 | 6/2011 | Theverapperuma et al. |
| 2011/0164761 | A1 | 7/2011 | McCowan |
| 2011/0169721 | A1 | 7/2011 | Bauer et al. |
| 2011/0184732 | A1 | 7/2011 | Godavarti |
| 2011/0191101 | A1 | 8/2011 | Uhle et al. |
| 2011/0243344 | A1 | 10/2011 | Bakalos et al. |
| 2011/0251704 | A1 | 10/2011 | Walsh et al. |
| 2011/0257967 | A1 | 10/2011 | Every et al. |
| 2011/0274291 | A1 | 11/2011 | Tashev et al. |
| 2011/0299695 | A1 | 12/2011 | Nicholson |
| 2011/0301948 | A1 | 12/2011 | Chen |
| 2012/0010881 | A1 | 1/2012 | Avendano et al. |
| 2012/0017016 | A1 | 1/2012 | Ma et al. |
| 2012/0027218 | A1 | 2/2012 | Every et al. |
| 2012/0093341 | A1 | 4/2012 | Kim et al. |
| 2012/0116758 | A1 | 5/2012 | Murgia et al. |
| 2012/0143363 | A1 | 6/2012 | Liu et al. |
| 2012/0179461 | A1 | 7/2012 | Every et al. |
| 2012/0198183 | A1 | 8/2012 | Wetzel et al. |
| 2013/0066628 | A1 | 3/2013 | Takahashi |
| 2013/0231925 | A1 | 9/2013 | Avendano et al. |
| 2013/0251170 | A1 | 9/2013 | Every et al. |
| 2013/0322643 | A1 | 12/2013 | Every et al. |

FOREIGN PATENT DOCUMENTS

| | | |
|---|---|---|
| TW | 201205560 | 2/2012 |
| TW | 201207845 | 2/2012 |
| TW | 201214418 | 4/2012 |
| TW | I466107 | 12/2014 |
| WO | WO2009035614 | 3/2009 |
| WO | 2011137258 | 3/2011 |
| WO | WO2011137258 | 3/2011 |
| WO | 2011133405 | 10/2011 |
| WO | WO2011133405 | 10/2011 |
| WO | WO2012009047 | 1/2012 |

OTHER PUBLICATIONS

Notice of Allowance, Mar. 4, 2013, U.S. Appl. No. 12/832,901, filed Jul. 8, 2010.

Non-Final, Jan. 16, 2013, U.S. Appl. No. 12/832,920, filed Jul. 8, 2010.

Notice of Allowance, May 13, 2013, U.S. Appl. No. 12/832,920, filed Jul. 8, 2010.

Non-Final, May 11, 2012, U.S. Appl. No. 13/424,189, filed Mar. 19, 2012.

Notice of Allowance, Mar. 7, 2013, U.S. Appl. No. 13/424,189, filed Mar. 19, 2012.

International Search Report and Written Opinion dated Jul. 5, 2011 in Application No. PCT/US11/32578.

International Search Report and Written Opinion dated Jul. 21, 2011 in Application No. PCT/US11/34373.

International Search Report and Written Opinion dated Sep. 1, 2011 in Application No. PCT/US11/37250.

Cisco, "Understanding How Digital T1 CAS (Robbed Bit Signaling) Works in IOS Gateways", Jan. 17, 2007, http://www.cisco.com/image/gif/paws/22444/t1-cas-ios.pdf, accessed on Apr. 3, 2012.

International Search Report and Written Opinion mailed Jul. 5, 2011 in Patent Cooperation Treaty Application No. PCT/US11/32578.

International Search Report and Written Opinion mailed Jul. 21, 2011 in Patent Cooperation Treaty Application No. PCT/US11/34373.

Goldin et al., Automatic Volume and Equalization Control in Mobile Devices, AES, 2006.

Guelou et al., Analysis of Two Structures for Combined Acoustic Echo Cancellation and Noise Reduction, IEEE, 1996.

Fazel et al., An overview of statistical pattern recognition techniques for speaker verification, IEEE, May 2011.

Sundaram et al., Discriminating two types of noise sources using cortical representation and dimension reduction technique, IEE, 2007.

Bach et al., Learning Spectral Clustering with application to spech separation, Journal of machine learning research, 2006.

Hioka et al., Estimating Direct to Reverberant energy ratio based on spatial correlation model segregating direct sound and reverberation, IEEE, Conference Mar. 14-19, 2010.

Avendano et al., Study on Dereverberation of Speech Based on Temporal Envelope Filtering, IEEE, Oct. 1996.

Park et al., Frequency Domain Acoustic Echo Suppression Based on Soft Decision, Interspeech 2009.

(56) References Cited

OTHER PUBLICATIONS

Tognieri et al., a comparison of the LBG,LVQ,MLP,SOM and GMM algorithms for Vector Quantisation and Clustering Analysis, 1992.
Klautau et al., Discriminative Gaussian Mixture Models a Comparison with Kernel Classifiers, ICML, 2003.
Usher et. al., Enhancement of Spatial Sound Quality a New Reverberation Extraction Audio Upmixer, IEEE, 2007.
Hoshuyama et al., "A Robust Generalized Sidelobe Canceller with a Blocking Matrix Using Leaky Adaptive Filters" 1997.
Spriet et al., "The impact of speech detection errors on the noise reduction performance of multi-channel Wiener filtering and Generalized Sidelobe Cancellation" 2005.
Hoshuyama et al., "A Robust Adaptive Beamformer for Microphone Arrays with a Blocking Matrix Using Constrained Adaptive Filters" 1999.
Herbordt et al., "Frequency-Domain Integration of Acoustic Echo Cancellation and a Generalized Sidelobe Canceller with Improved Robustness" 2002.
Office Action mailed Jun. 5, 2014 in Taiwanese Patent Application 100115214, filed Apr. 29, 2011.
Office Action mailed Oct. 30, 2014 in Korean Patent Application No. 10-2012-7027238, filed Apr. 14, 2011.
Jung et al., "Feature Extraction through the Post Processing of WFBA Based on MMSE-STSA for Robust Speech Recognition," Proceedings of the Acoustical Society of Korea Fall Conference, vol. 23, No. 2(s), pp. 39-42, Nov. 2004.
Notice of Allowance dated Nov. 7, 2014 in Taiwanese Application No. 100115214, filed Apr. 29, 2011.
Krini, Mohamed et al., "Model-Based Speech Enhancement," in Speech and Audio Processing in Adverse Environments; Signals and Communication Technology, edited by Hansler et al., 2008, Chapter 4, pp. 89-134.
Office Action mailed Dec. 10, 2014 in Finnish Patent Application No. 20126083, filed Apr. 14, 2011.
Lu et al., "Speech Enhancement Using Hybrid Gain Factor in Critical-Band-Wavelet-Packet Transform", Digital Signal Processing, vol. 17, Jan. 2007, pp. 172-188.
Kim et al., "Improving Speech Intelligibility in Noise Using Environment-Optimized Algorithms," IEEE Transactions on Audio, Speech, and Language Processsing, vol. 18, No. 8, Nov. 2010, pp. 2080-2090.
Sharma et al., "Rotational Linear Discriminant Analysis Technique for Dimensionality Reduction," IEEE Transactions on Knowledge and Data Engineering, vol. 20, No. 10, Oct. 2008, pp. 1336-1347.
Temko et al., "Classiciation of Acoustinc Events Using SVM-Based Clustering Schemes," Pattern Recognition 39, No. 4, 2006, pp. 682-694.
Office Action mailed Jun. 26, 2015 in South Korean Patent Application 1020127027238 filed Apr. 14, 2011.
Office Action mailed Jun. 23, 2015 in Japanese Patent Application 2013-508256 filed Apr. 28, 2011.
Office Action mailed Jun. 23, 2015 in Finnish Patent Application 20126106 filed Apr. 28, 2011.
Office Action mailed Jul. 2, 2015 in Finnish Patent Application 20126083 filed Apr. 14, 2011.
Office Action mailed Jun. 17, 2015 in Japanese Patent Application 2013-519682 filed May 19, 2011.
Office Action mailed Jun. 23, 2015 in Japanese Patent Application 2013-506188 filed Apr. 14, 2011.
3GPP2 "Enhanced Variable Rate Codec, Speech Service Options 3, 68, 70, and 73 for Wideband Spread Spectrum Digital Systems", May 2009, pp. 1-308.
3GPP2 "Selectable Mode Vocoder (SMV) Service Option for Wideband Spread Spectrum Communication Systems", Jan. 2004, pp. 1-231.
3GPP2 "Source-Controlled Variable-Rate Multimode Wideband Speech Codec (VMR-WB) Service Option 62 for Spread Spectrum Systems", Jun. 11, 2004, pp. 1-164.
3GPP "3GPP Specification 26.071 Mandatory Speech Codec Speech Processing Functions; AMR Speech Codec; General Description", http://www.3gpp.org/ftp/Specs/html-info/26071.htm, accessed on Jan. 25, 2012.
3GPP "3GPP Specification 26.094 Mandatory Speech Codec Speech Processing Functions; Adaptive Multi-Rate (AMR) Speech Codec; Voice Activity Detector (VAD)", http://www.3gpp.org/ftp/Specs/html-info/26094.htm, accessed on Jan. 25, 2012.
3GPP "3GPP Specification 26.171 Speech Codec Speech Processing Functions; Adaptive Multi-Rate—Wideband (AMR-WB) Speech Codec; General Description", http://www.3gpp.org/ftp/Specs/html-info26171.htm, accessed on Jan. 25, 2012.
3GPP "3GPP Specification 26.194 Speech Codec Speech Processing Functions; Adaptive Multi-Rate—Wideband (AMR-WB) Speech Codec; Voice Activity Detector (VAD)" http://www.3gpp.org/ftp/Specs/html-info26194.htm, accessed on Jan. 25, 2012.
International Telecommunication Union "Coding of Speech at 8 kbit/s Using Conjugate-Structure Algebraic-code-excited Linear-prediction (CS-ACELP)", Mar. 19, 1996, pp. 1-39.
International Telecommunication Union "Coding of Speech at 8 kbit/s Using Conjugate Structure Algebraic-code-excited Linear-prediction (CS-ACELP) Annex B: A Silence Compression Scheme for G.729 Optimized for Terminals Conforming to Recommendation V.70", Nov. 8, 1996, pp. 1-23.

* cited by examiner

MULTI-MICROPHONE ROBUST NOISE SUPPRESSION

CROSS-REFERENCE TO RELATED APPLICATIONS

This application is a continuation of U.S. application Ser. No. 12/832,920 (now U.S. Pat. No. 8,538,035, issued Sep. 17, 2013), filed Jul. 8, 2010, which claims the benefit of U.S. Provisional Application Ser. No. 61/329,322, filed Apr. 29, 2010. This application is related to U.S. patent application Ser. No. 12/832,901, filed Jul. 8, 2010. The disclosures of the aforementioned applications are incorporated herein by reference.

BACKGROUND OF THE INVENTION

1. Field of the Invention

The present invention relates generally to audio processing, and more particularly to a noise suppression processing of an audio signal.

2. Description of Related Art

Currently, there are many methods for reducing background noise in an adverse audio environment. A stationary noise suppression system suppresses stationary noise, by either a fixed or varying number of dB. A fixed suppression system suppresses stationary or non-stationary noise by a fixed number of dB. The shortcoming of the stationary noise suppressor is that non-stationary noise will not be suppressed, whereas the shortcoming of the fixed suppression system is that it must suppress noise by a conservative level in order to avoid speech distortion at low signal-to-noise ratios (SNR).

Another form of noise suppression is dynamic noise suppression. A common type of dynamic noise suppression systems is based on SNR. The SNR may be used to determine a suppression value. Unfortunately, SNR by itself is not a very good predictor of speech distortion due to the presence of different noise types in the audio environment. Typically, speech energy, over a given period of time, will include a word, a pause, a word, a pause, and so forth. Additionally, stationary and dynamic noises may be present in the audio environment. The SNR averages all of these stationary and non-stationary speech and noise components. There is no consideration in the determination of the SNR of the characteristics of the noise signal—only the overall level of noise.

To overcome the shortcomings of the prior art, there is a need for an improved noise suppression system for processing audio signals.

SUMMARY OF THE INVENTION

The present technology provides a robust noise suppression system which may concurrently reduce noise and echo components in an acoustic signal while limiting the level of speech distortion. The system may receive acoustic signals from two or more microphones in a close-talk, hand-held or other configuration. The received acoustic signals are transformed to cochlea domain sub-band signals and echo and noise components may be subtracted from the sub-band signals. Features in the acoustic sub-band signals are identified and used to generate a multiplicative mask. The multiplicative mask is applied to the noise subtracted sub-band signals and the sub-band signals are reconstructed in the time domain.

An embodiment includes a system for performing noise reduction in an audio signal may include a memory. A frequency analysis module stored in the memory and executed by a processor may generate sub-band signals in a cochlea domain from time domain acoustic signals. A noise cancellation module stored in the memory and executed by a processor may cancel at least a portion of the sub-band signals. A modifier module stored in the memory and executed by a processor may suppress a noise component or an echo component in the modified sub-band signals. A reconstructor module stored in the memory and executed by a processor may reconstruct a modified time domain signal from the component suppressed sub-band signals provided by the modifier module.

Noise reduction may also be performed as a process performed by a machine with a processor and memory. Additionally, a computer readable storage medium may be implemented in which a program is embodied, the program being executable by a processor to perform a method for reducing noise in an audio signal.

DETAILED DESCRIPTION OF THE INVENTION

The present technology provides a robust noise suppression system which may concurrently reduce noise and echo components in an acoustic signal while limiting the level of speech distortion. The system may receive acoustic signals from two or more microphones in a close-talk, hand-held or other configuration. The received acoustic signals are transformed to cochlea domain sub-band signals and echo and noise components may be subtracted from the sub-band signals. Features in the acoustic sub-band signals are identified and used to generate a multiplicative mask. The multiplicative mask is applied to the noise subtracted sub-band signals and the sub-band signals are reconstructed in the time domain. The present technology is both a dynamic and non-stationary noise suppression system, and provides a "perceptually optimal" amount of noise suppression based upon the characteristics of the noise and use case.

Performing noise (and echo) reduction via a combination of noise cancellation and noise suppression allows for flexibility in audio device design. In particular, a combination of subtractive and multiplicative stages is advantageous because it allows for both flexibility of microphone placement on an audio device and use case (e.g. close-talk/far-talk) whilst optimizing the overall tradeoff of voice quality vs. noise suppression. The microphones may be positioned within four centimeters of each other for a "close microphone" configuration" or greater than four centimeters apart for a "spread microphone" configuration, or a combination of configurations with greater than two microphones.

Figure 1:
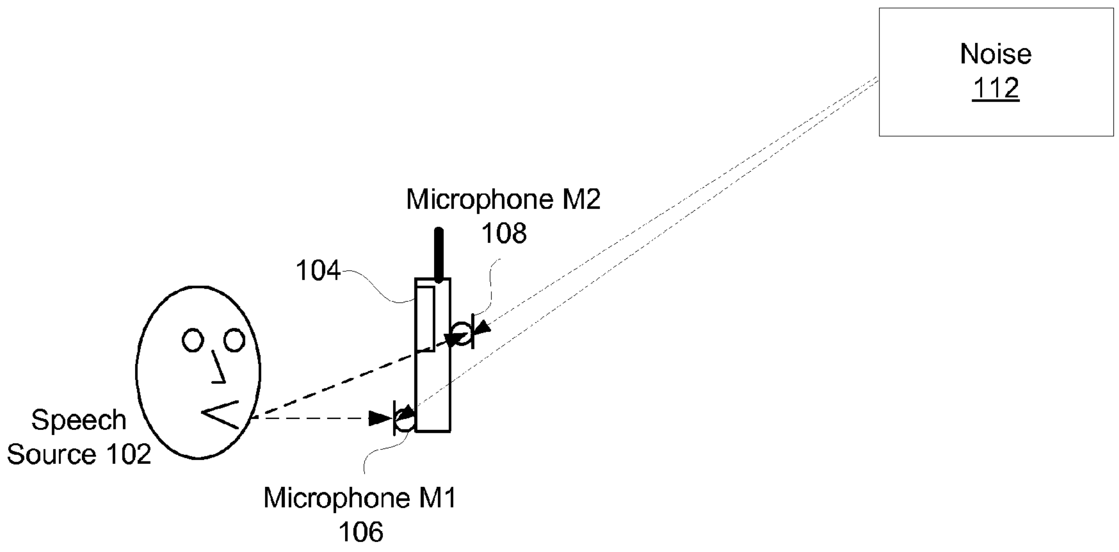
FIG. 1 is an illustration of an environment in which embodiments of the present technology may be used.

FIG. 1 is an illustration of an environment in which embodiments of the present technology may be used. A user may act as an audio (speech) source 102 to an audio device 104. The exemplary audio device 104 includes two microphones: a primary microphone 106 relative to the audio source 102 and a secondary microphone 108 located a distance away from the primary microphone 106. Alternatively, the audio device 104 may include a single microphone. In yet other embodiments, the audio device 104 may include more than two microphones, such as for example three, four, five, six, seven, eight, nine, ten or even more microphones.

The primary microphone 106 and secondary microphone 108 may be omni-directional microphones. Alternatively embodiments may utilize other forms of microphones or acoustic sensors, such as directional microphones.

While the microphones 106 and 108 receive sound (i.e. acoustic signals) from the audio source 102, the microphones 106 and 108 also pick up noise 112. Although the noise 112 is shown coming from a single location in FIG. 1, the noise 112 may include any sounds from one or more locations that differ from the location of audio source 102, and may include reverberations and echoes. The noise 112 may be stationary, non-stationary, and/or a combination of both stationary and non-stationary noise.

Some embodiments may utilize level differences (e.g. energy differences) between the acoustic signals received by the two microphones 106 and 108. Because the primary microphone 106 is much closer to the audio source 102 than the secondary microphone 108 in a close-talk use case, the intensity level is higher for the primary microphone 106, resulting in a larger energy level received by the primary microphone 106 during a speech/voice segment, for example.

The level difference may then be used to discriminate speech and noise in the time-frequency domain. Further embodiments may use a combination of energy level differences and time delays to discriminate speech. Based on binaural cue encoding, speech signal extraction or speech enhancement may be performed.

Figure 2:
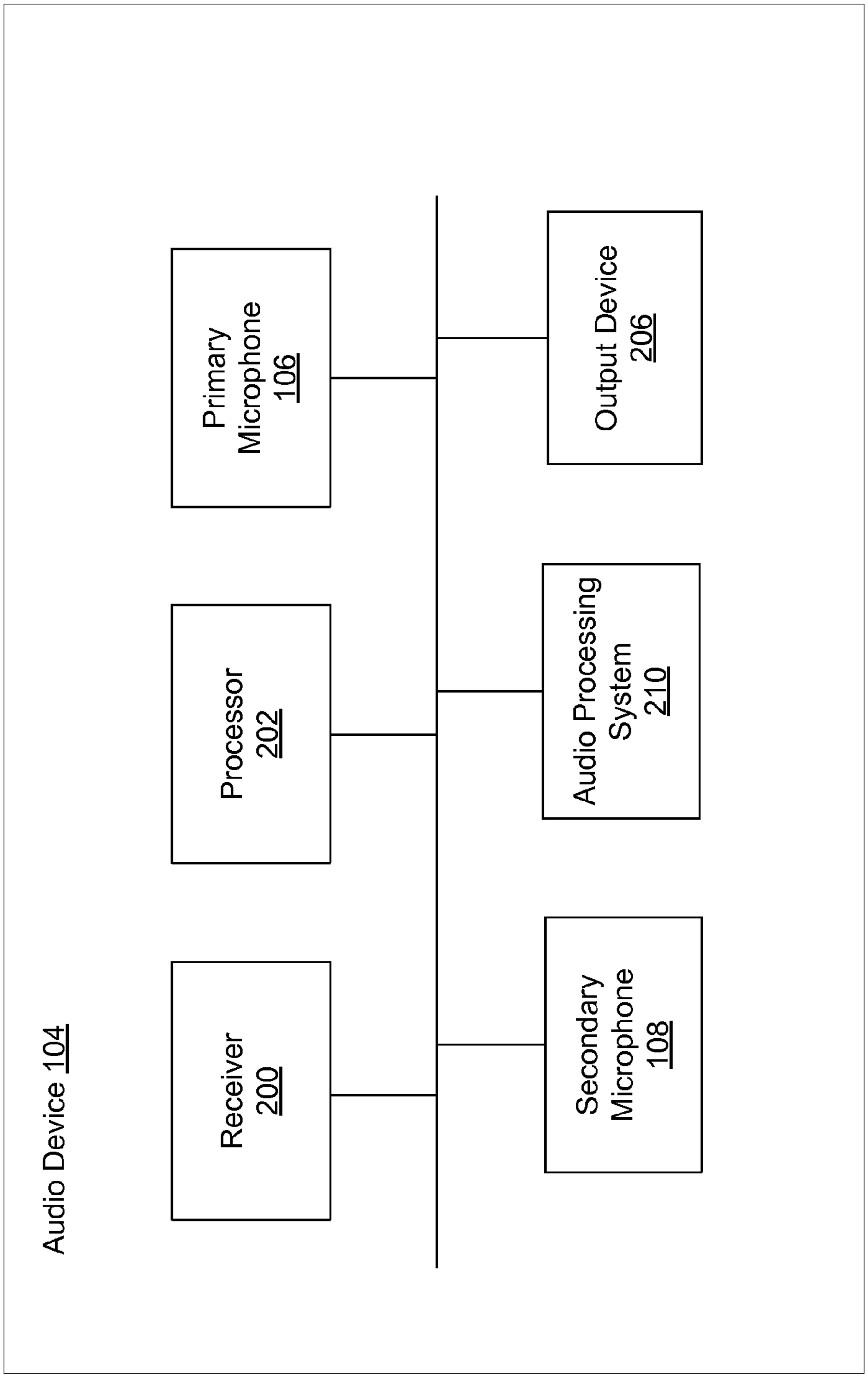
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, an optional secondary microphone 108, an audio processing system 210, and an output device 206. The audio device 104 may include further or other components necessary for audio device 104 operations. Similarly, the audio device 104 may include fewer components that perform similar or equivalent functions to those depicted in FIG. 2.

Processor 202 may execute instructions and modules stored in a memory (not illustrated in FIG. 2) in the audio device 104 to perform functionality described herein, including noise reduction for an acoustic signal. Processor 202 may include hardware and software implemented as a processing unit, which may process floating point operations and other operations for the processor 202.

The exemplary receiver 200 is an acoustic sensor configured to receive a signal from a communications network. In some embodiments, the receiver 200 may include an antenna device. The signal may then be forwarded to the audio processing system 210 to reduce noise using the techniques described herein, and provide an audio signal to the output device 206. The present technology may be used in one or both of the transmit and receive paths of the audio device 104.

The audio processing system 210 is configured to receive the acoustic signals from an acoustic source via the primary microphone 106 and secondary microphone 108 and process the acoustic signals. Processing may include performing noise reduction within an acoustic signal. The audio processing system 210 is discussed in more detail below. The primary and secondary microphones 106, 108 may be spaced a distance apart in order to allow for detecting an energy level difference, time difference or phase difference between them. The acoustic signals received by primary microphone 106 and secondary microphone 108 may be converted into electrical signals (i.e. a primary electrical signal and a secondary electrical signal). The electrical signals may themselves be converted by an analog-to-digital converter (not shown) into digital signals for processing in accordance with some embodiments. In order to differentiate the acoustic signals for clarity purposes, the acoustic signal received by the primary microphone 106 is herein referred to as the primary acoustic signal, while the acoustic signal received from by the secondary microphone 108 is herein referred to as the secondary acoustic signal. The primary acoustic signal and the secondary acoustic signal may be processed by the audio processing system 210 to produce a signal with an improved signal-to-noise ratio. It should be noted that embodiments of the technology described herein may be practiced utilizing only the primary microphone 106.

The output device 206 is any device which provides an audio output to the user. For example, the output device 206 may include a speaker, an earpiece of a headset or handset, or a speaker on a conference device.

In various embodiments, where the primary and secondary microphones are omni-directional microphones that are closely-spaced (e.g., 1-2 cm apart), a beamforming technique may be used to simulate forwards-facing and backwards-facing directional microphones. The level difference may be used to discriminate speech and noise in the time-frequency domain which can be used in noise reduction.

Figure 3:
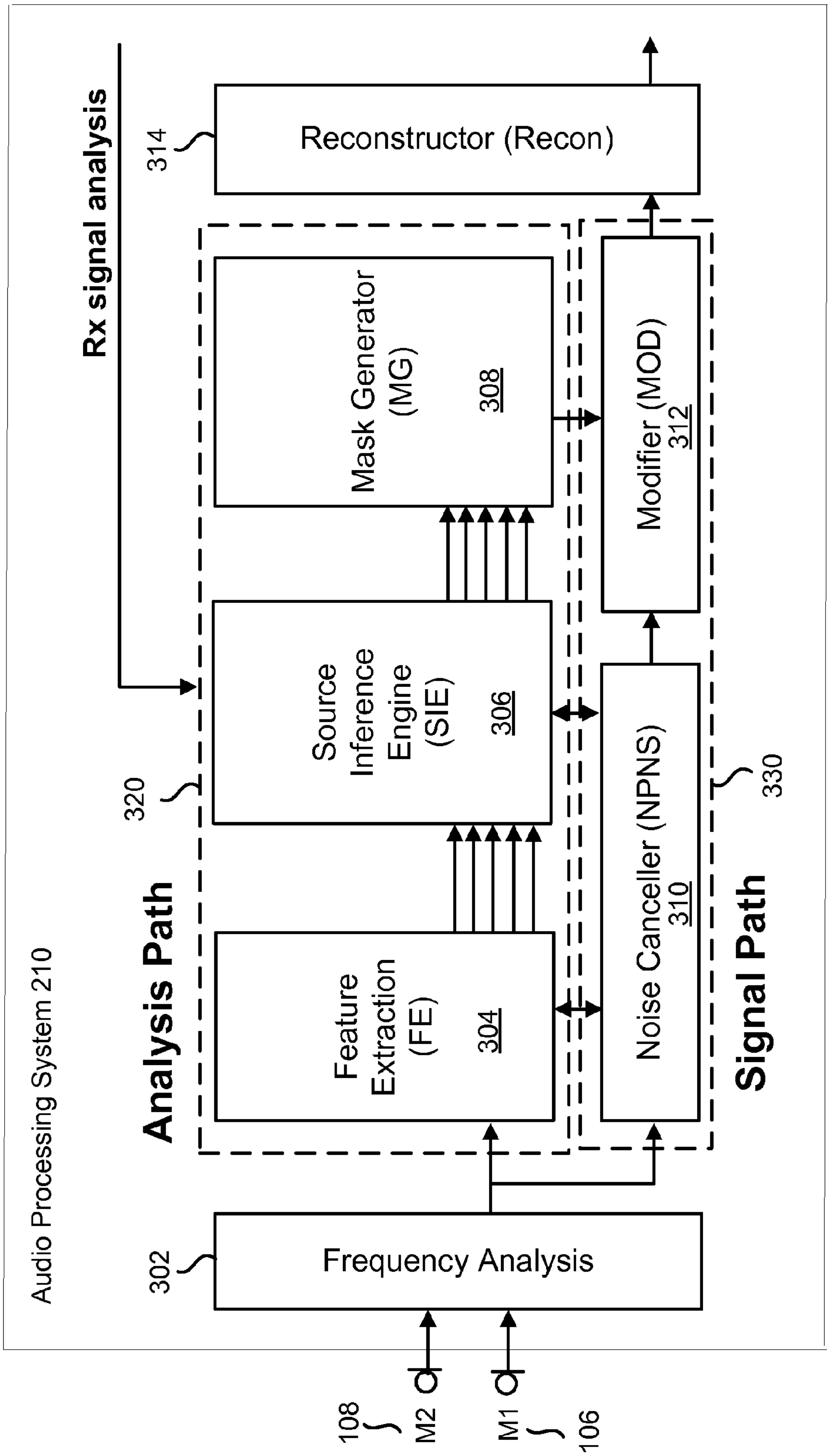
FIG. 3 is a block diagram of an exemplary audio processing system.

FIG. 3 is a block diagram of an exemplary audio processing system 210 for performing noise reduction as described herein. In exemplary embodiments, the audio processing system 210 is embodied within a memory device within audio device 104. The audio processing system 210 may include a frequency analysis module 302, a feature extraction module 304, a source inference engine module 306, mask generator module 308, noise canceller module 310, modifier module 312, and reconstructor module 314. Audio processing system 210 may include more or fewer components than illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number of and type of signals communicated between modules.

In operation, acoustic signals received from the primary microphone 106 and second microphone 108 are converted to electrical signals, and the electrical signals are processed through frequency analysis module 302. The acoustic signals may be pre-processed in the time domain before being processed by frequency analysis module 302. Time domain pre-processing may include applying input limiter gains, speech time stretching, and filtering using an FIR or IIR filter.

The frequency analysis module 302 takes the acoustic signals and mimics the frequency analysis of the cochlea (e.g., cochlear domain), simulated by a filter bank. The frequency analysis module 302 separates each of the primary and secondary acoustic signals into two or more frequency sub-band signals. A sub-band signal is the result of a filtering operation on an input signal, where the bandwidth of the filter is narrower than the bandwidth of the signal received by the frequency analysis module 302. The filter bank may be implemented by a series of cascaded, complex-valued, first-order IIR filters. Alternatively, other filters such as short-time Fourier transform (STFT), sub-band filter banks, modulated complex lapped transforms, cochlear models, wavelets, etc., can be used for the frequency analysis and synthesis. The samples of the frequency sub-band signals may be grouped sequentially into time frames (e.g. over a predetermined period of time). For example, the length of a frame may be 4 ms, 8 ms, or some other length of time. In some embodiments there may be no frame at all. The results may include sub-band signals in a fast cochlea transform (FCT) domain.

The sub-band frame signals are provided from frequency analysis module 302 to an analysis path sub-system 320 and a signal path sub-system 330. The analysis path sub-system 320 may process the signal to identify signal features, distinguish between speech components and noise components of the sub-band signals, and generate a signal modifier. The signal path sub-system 330 is responsible for modifying sub-band signals of the primary acoustic signal by reducing noise in the sub-band signals. Noise reduction can include applying a modifier, such as a multiplicative gain mask generated in the analysis path sub-system 320, or by subtracting components from the sub-band signals. The noise reduction may reduce noise and preserve the desired speech components in the sub-band signals.

Signal path sub-system 330 includes noise canceller module 310 and modifier module 312. Noise canceller module 310 receives sub-band frame signals from frequency analysis module 302. Noise canceller module 310 may subtract (e.g., cancel) a noise component from one or more sub-band signals of the primary acoustic signal. As such, noise canceller module 310 may output sub-band estimates of noise components in the primary signal and sub-band estimates of speech components in the form of noise-subtracted sub-band signals.

Noise canceller module 310 may provide noise cancellation, for example in systems with two-microphone configurations, based on source location by means of a subtractive algorithm. Noise canceller module 310 may also provide echo cancellation and is intrinsically robust to loudspeaker and Rx path non-linearity. By performing noise and echo cancellation (e.g., subtracting components from a primary signal sub-band) with little or no voice quality degradation, noise canceller module 310 may increase the speech-to-noise ratio (SNR) in sub-band signals received from frequency analysis module 302 and provided to modifier module 312 and post filtering modules. The amount of noise cancellation performed may depend on the diffuseness of the noise source and the distance between microphones, both of which contribute towards the coherence of the noise between the microphones, with greater coherence resulting in better cancellation.

Noise canceller module 310 may be implemented in a variety of ways. In some embodiments, noise canceller module 310 may be implemented with a single null processing noise subtraction (NPNS) module. Alternatively, noise canceller module 310 may include two or more NPNS modules, which may be arranged for example in a cascaded fashion.

An example of noise cancellation performed in some embodiments by the noise canceller module 310 is disclosed in U.S. patent application Ser. No. 12/215,980, entitled "System and Method for Providing Noise Suppression Utilizing Null Processing Noise Subtraction," filed Jun. 30, 2008, U.S. application Ser. No. 12/422,917, entitled "Adaptive Noise Cancellation," filed Apr. 13, 2009, and U.S. application Ser. No. 12/693,998, entitled "Adaptive Noise Reduction Using Level Cues," filed Jan. 26, 2010, the disclosures of which are each incorporated herein by reference.

The feature extraction module 304 of the analysis path sub-system 320 receives the sub-band frame signals derived from the primary and secondary acoustic signals provided by frequency analysis module 302 as well as the output of NPNS module 310. Feature extraction module 304 computes frame energy estimations of the sub-band signals, inter-microphone level differences (ILD), inter-microphone time differences (ITD) and inter-microphones phase differences (IPD) between the primary acoustic signal and the secondary acoustic signal, self-noise estimates for the primary and second microphones, as well as other monaural or binaural features which may be utilized by other modules, such as pitch estimates and cross-correlations between microphone signals. The feature extraction module 304 may both provide inputs to and process outputs from NPNS module 310.

Feature extraction module 304 may generate a null-processing inter-microphone level difference (NP-ILD). The NP-ILD may be used interchangeably in the present system with a raw ILD. A raw ILD between a primary and secondary microphone may be determined by an ILD module within feature extraction module 304. The ILD computed by the ILD module in one embodiment may be represented mathematically by $$ILD = \left[\left\lfloor c \cdot \log_2\left(\frac{E_1}{E_2}\right)\right\rfloor_{-1}\right]^{+1}$$

where E1 and E2 are the energy outputs of the primary and secondary microphones 106, 108, respectively, computed in each sub-band signal over non-overlapping time intervals ("frames"). This equation describes the dB ILD normalized by a factor of c and limited to the range [−1, +1]. Thus, when the audio source 102 is close to the primary microphone 106 for E1 and there is no noise, ILD=1, but as more noise is added, the ILD will be reduced.

In some cases, where the distance between microphones is small with respect to the distance between the primary microphone and the mouth, raw ILD may not be useful to discriminate a source from a distracter, since both source and distracter may have roughly equal raw ILD. In order to avoid limitations regarding raw ILD used to discriminate a source from a distracter, outputs of noise canceller module 310 may be used to derive an ILD having a positive value for the speech signal and small or negative value for the noise components since these will be significantly attenuated at the output of the noise canceller module 310. The ILD derived from the noise canceller module 310 outputs may be a Null Processing Inter-microphone Level Difference (NP-ILD), and represented mathematically by:

$$NP-ILD = \left[\left\lfloor c \cdot \log_2\left(\frac{E_{NP}}{E_2}\right)\right\rfloor_{-1}\right]^{+1}$$

NPNS module may provide noise cancelled sub-band signals to the ILD block in the feature extraction module 304. Since the ILD may be determined as the ratio of the NPNS output signal energy to the secondary microphone energy, ILD is often interchangeable with Null Processing Inter-microphone Level Difference (NP-ILD). "Raw-ILD" may be used to disambiguate a case where the ILD is computed from the "raw" primary and secondary microphone signals.

Determining energy level estimates and inter-microphone level differences is discussed in more detail in U.S. patent application Ser. No. 11/343,524, entitled "System and Method for Utilizing Inter-Microphone Level Differences for Speech Enhancement", which is incorporated by reference herein.

Source inference engine module 306 may process the frame energy estimations provided by feature extraction module 304 to compute noise estimates and derive models of the noise and speech in the sub-band signals. Source inference engine module 306 adaptively estimates attributes of the acoustic sources, such as their energy spectra of the output signal of the NPNS module 310. The energy spectra attribute may be utilized to generate a multiplicative mask in mask generator module 308.

The source inference engine module 306 may receive the NP-ILD from feature extraction module 304 and track the NP-ILD probability distributions or "clusters" of the target audio source 102, background noise and optionally echo.

This information is then used, along with other auditory cues, to define classification boundaries between source and noise classes. The NP-ILD distributions of speech, noise and echo may vary over time due to changing environmental conditions, movement of the audio device 104, position of the hand and/or face of the user, other objects relative to the audio device 104, and other factors. The cluster tracker adapts to the time-varying NP-ILDs of the speech or noise source(s).

When ignoring echo, without any loss of generality, when the source and noise ILD distributions are non-overlapping, it is possible to specify a classification boundary or dominance threshold between the two distributions, such that the signal is classified as speech if the SNR is sufficiently positive or as noise if the SNR is sufficiently negative. This classification may be determined per sub-band and time-frame as a dominance mask, and output by a cluster tracker module to a noise estimator module within the source inference engine module 306.

The cluster tracker may determine a global summary of acoustic features based, at least in part, on acoustic features derived from an acoustic signal, as well as an instantaneous global classification based on a global running estimate and the global summary of acoustic features. The global running estimates may be updated and an instantaneous local classification is derived based on at least the one or more acoustic features. Spectral energy classifications may then be determined based, at least in part, on the instantaneous local classification and the one or more acoustic features.

In some embodiments, the cluster tracker module classifies points in the energy spectrum as being speech or noise based on these local clusters and observations. As such, a local binary mask for each point in the energy spectrum is identified as either speech or noise.

The cluster tracker module may generate a noise/speech classification signal per sub-band and provide the classification to NPNS module 310. In some embodiments, the classification is a control signal indicating the differentiation between noise and speech. Noise canceller module 310 may utilize the classification signals to estimate noise in received microphone signals. In some embodiments, the results of cluster tracker module may be forwarded to the noise estimate module within the source inference engine module 306. In other words, a current noise estimate along with locations in the energy spectrum where the noise may be located are provided for processing a noise signal within audio processing system 210.

An example of tracking clusters by a cluster tracker module is disclosed in U.S. patent application Ser. No. 12/004,897, entitled "System and Method for Adaptive Classification of Audio Sources," filed on Dec. 21, 2007, the disclosure of which is incorporated herein by reference.

Source inference engine module 306 may include a noise estimate module which may receive a noise/speech classification control signal from the cluster tracker module and the output of noise canceller module 310 to estimate the noise N(t,w), wherein t is a point in time and W represents a frequency or sub-band. The noise estimate determined by noise estimate module is provided to mask generator module 308. In some embodiments, mask generator module 308 receives the noise estimate output of noise canceller module 310 and an output of the cluster tracker module.

The noise estimate module in the source inference engine module 306 may include an NP-ILD noise estimator and a stationary noise estimator. The noise estimates can be combined, such as for example with a max( ) operation, so that the noise suppression performance resulting from the combined noise estimate is at least that of the individual noise estimates.

The NP-ILD noise estimate may be derived from the dominance mask and noise canceller module 310 output signal energy. When the dominance mask is 1 (indicating speech) in a particular sub-band, the noise estimate is frozen, and when the dominance mask is 0 (indicating noise) in a particular sub-band, the noise estimate is set equal to the NPNS output signal energy. The stationary noise estimate tracks components of the NPNS output signal that vary more slowly than speech typically does, and the main input to this module is the NPNS output energy.

The mask generator module 308 receives models of the sub-band speech components and noise components as estimated by the source inference engine module 306 and generates a multiplicative mask. The multiplicative mask is applied to the estimated noise subtracted sub-band signals provided by NPNS 310 to modifier 312. The modifier module 312 multiplies the gain masks to the noise-subtracted sub-band signals of the primary acoustic signal output by the NPNS module 310. Applying the mask reduces energy levels of noise components in the sub-band signals of the primary acoustic signal and results in noise reduction.

The multiplicative mask is defined by a Wiener filter and a voice quality optimized suppression system. The Wiener filter estimate may be based on the power spectral density of noise and a power spectral density of the primary acoustic signal. The Wiener filter derives a gain based on the noise estimate. The derived gain is used to generate an estimate of the theoretical MMSE of the clean speech signal given the noisy signal. To limit the amount of speech distortion as a result of the mask application, the Wiener gain may be limited at a lower end using a perceptually-derived gain lower bound The values of the gain mask output from mask generator module 308 are time and sub-band signal dependent and optimize noise reduction on a per sub-band basis. The noise reduction may be subject to the constraint that the speech loss distortion complies with a tolerable threshold limit. The threshold limit may be based on many factors, such as for example a voice quality optimized suppression (VQOS) level. The VQOS level is an estimated maximum threshold level of speech loss distortion in the sub-band signal introduced by the noise reduction. The VQOS is tunable and takes into account the properties of the sub-band signal, and provides full design flexibility for system and acoustic designers. A lower bound for the amount of noise reduction performed in a sub-band signal is determined subject to the VQOS threshold, thereby limiting the amount of speech loss distortion of the sub-band signal. As a result, a large amount of noise reduction may be performed in a sub-band signal when possible, and the noise reduction may be smaller when conditions such as unacceptably high speech loss distortion do not allow for the large amount of noise reduction.

In embodiments, the energy level of the noise component in the sub-band signal may be reduced to no less than a residual noise target level, which may be fixed or slowly time-varying. In some embodiments, the residual noise target level is the same for each sub-band signal, in other embodiments it may vary across sub-bands. Such a target level may be a level at which the noise component ceases to be audible or perceptible, below a self-noise level of a microphone used to capture the primary acoustic signal, or below a noise gate of a component on a baseband chip or of an internal noise gate within a system implementing the noise reduction techniques.

Modifier module 312 receives the signal path cochlear samples from noise canceller module 310 and applies a gain mask received from mask generator 308 to the received samples. The signal path cochlear samples may include the noise subtracted sub-band signals for the primary acoustic signal. The mask provided by the Weiner filter estimation may vary quickly, such as from frame to frame, and noise and speech estimates may vary between frames. To help address the variance, the upwards and downwards temporal slew rates of the mask may be constrained to within reasonable limits by modifier 312. The mask may be interpolated from the frame rate to the sample rate using simple linear interpolation, and applied to the sub-band signals by multiplicative noise suppression. Modifier module 312 may output masked frequency sub-band signals.

Reconstructor module 314 may convert the masked frequency sub-band signals from the cochlea domain back into the time domain. The conversion may include adding the masked frequency sub-band signals and phase shifted signals. Alternatively, the conversion may include multiplying the masked frequency sub-band signals with an inverse frequency of the cochlea channels. Once conversion to the time domain is completed, the synthesized acoustic signal may be output to the user via output device 206 and/or provided to a codec for encoding.

In some embodiments, additional post-processing of the synthesized time domain acoustic signal may be performed. For example, comfort noise generated by a comfort noise generator may be added to the synthesized acoustic signal prior to providing the signal to the user. Comfort noise may be a uniform constant noise that is not usually discernible to a listener (e.g., pink noise). This comfort noise may be added to the synthesized acoustic signal to enforce a threshold of audibility and to mask low-level non-stationary output noise components. In some embodiments, the comfort noise level may be chosen to be just above a threshold of audibility and may be settable by a user. In some embodiments, the mask generator module 308 may have access to the level of comfort noise in order to generate gain masks that will suppress the noise to a level at or below the comfort noise.

The system of FIG. 3 may process several types of signals received by an audio device. The system may be applied to acoustic signals received via one or more microphones. The system may also process signals, such as a digital Rx signal, received through an antenna or other connection.

Figure 4:
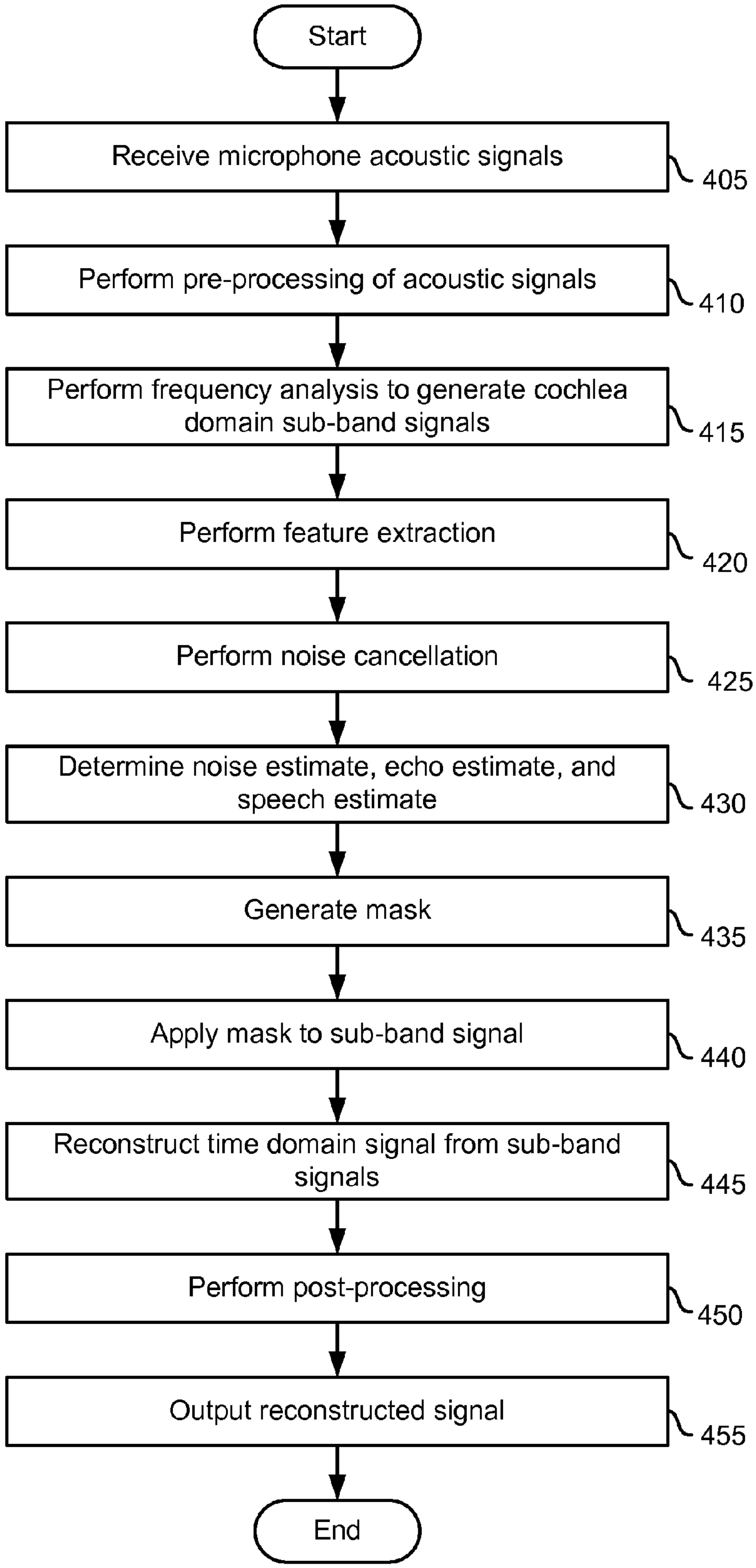
FIG. 4 is a flowchart of an exemplary method for performing noise reduction for an acoustic signal.
Figure 5:
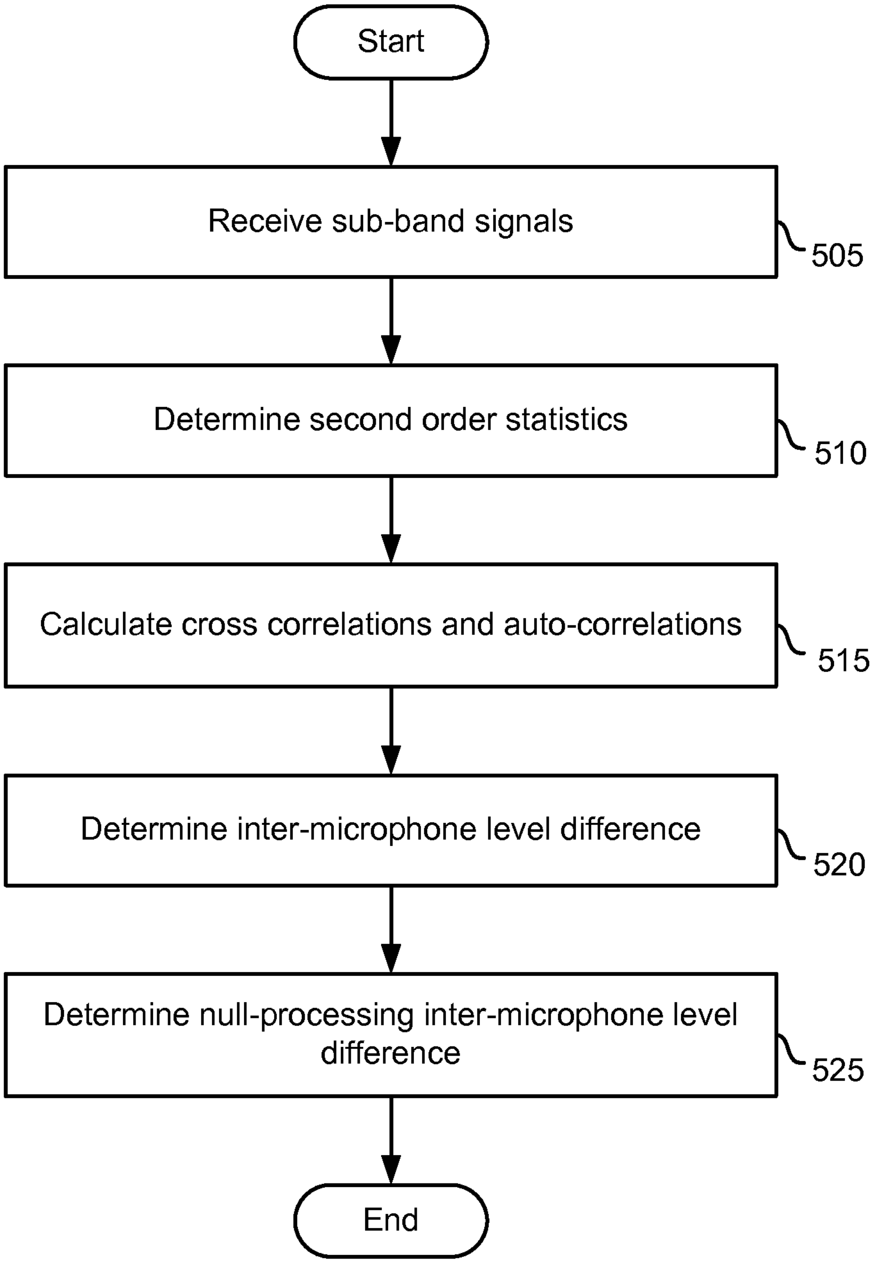
FIG. 5 is a flowchart of an exemplary method for extracting features from audio signals.

FIGS. 4 and 5 include flowcharts of exemplary methods for performing the present technology. Each step of FIGS. 4 and 5 may be performed in any order, and the methods of FIGS. 4 and 5 may each include additional or fewer steps than those illustrated.

FIG. 4 is a flowchart of an exemplary method for performing noise reduction for an acoustic signal. Microphone acoustic signals may be received at step 405. The acoustic signals received by microphones 106 and 108 may each include at least a portion of speech and noise. Pre-processing may be performed on the acoustic signals at step 410. The pre-processing may include applying a gain, equalization and other signal processing to the acoustic signals.

Sub-band signals are generated in a cochlea domain at step 415. The sub-band signals may be generated from time domain signals using a cascade of complex filters.

Feature extraction is performed at step 420. The feature extraction may extract features from the sub-band signals that are used to cancel a noise component, infer whether a sub-band has noise or echo, and generate a mask. Performing feature extraction is discussed in more detail with respect to FIG. 5.

Noise cancellation is performed at step 425. The noise cancellation can be performed by NPNS module 310 on one or more sub-band signals received from frequency analysis module 302. Noise cancellation may include subtracting a noise component from a primary acoustic signal sub-band. In some embodiments, an echo component may be cancelled from a primary acoustic signal sub-band. The noise-cancelled (or echo-cancelled) signal may be provided to feature extraction module 304 to determine a noise component energy estimate and to source inference engine 306.

A noise estimate, echo estimate, and speech estimate may be determined for sub-bands at step 430. Each estimate may be determined for each sub-band in an acoustic signal and for each frame in the acoustic audio signal. The echo may be determined at least in part from an Rx signal received by source inference engine 306. The inference as to whether a sub-band within a particular time frame is determined to be noise, speech or echo is provided to mask generator module 308.

A mask is generated at step 435. The mask may be generated by mask generator 308. A mask may be generated and applied to each sub-band during each frame based on a determination as to whether the particular sub-band is determined to be noise, speech or echo. The mask may be generated based on voice quality optimized suppression—a level of suppression determined to be optimized for a particular level of voice distortion. The mask may then be applied to a sub-band at step 440. The mask may be applied by modifier 312 to the sub-band signals output by NPNS 310. The mask may be interpolated from frame rate to sample rate by modifier 312.

A time domain signal is reconstructed from sub-band signals at step 445. The time band signal may be reconstructed by applying a series of delays and complex multiply operations to the sub-band signals by reconstructor module 314. Post processing may then be performed on the reconstructed time domain signal at step 450. The post processing may be performed by a post processor and may include applying an output limiter to the reconstructed signal, applying an automatic gain control, and other post-processing. The reconstructed output signal may then be output at step 455.

FIG. 5 is a flowchart of an exemplary method for extracting features from audio signals. The method of FIG. 5 may provide more detail for step 420 of the method of FIG. 4.

Sub-band signals are received at step 505. Feature extraction module 304 may receive sub-band signals from frequency analysis module 302 and output signals from noise canceller module 310. Second order statistics, such as for example sub-band energy levels, are determined at step 510. The energy sub-band levels may be determined for each sub-band for each frame. Cross correlations between microphones and autocorrelations of microphone signals may be calculated at step 515. An inter-microphone level difference (ILD) is determined at step 520. A null processing inter-microphone level difference (NP-ILD) is determined at step 525. Both the ILD and the NP-ILD are determined at least in part from the sub-band signal energy and the noise estimate energy. The extracted features are then utilized by the audio processing system in reducing the noise in sub-band signals.

The above described modules, including those discussed with respect to FIG. 3, may include instructions stored in a storage media such as a machine readable medium (e.g., computer readable medium). These instructions may be retrieved and executed by the processor 202 to perform the functionality discussed herein. Some examples of instructions include software, program code, and firmware. Some examples of storage media include memory devices and integrated circuits.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A system for performing noise reduction in an audio signal, the system comprising:

a memory;

a frequency analysis module stored in the memory and executed by a processor to generate a plurality of sub-band signals in a frequency domain from time domain acoustic signals;

a noise cancellation module stored in the memory and executed by a processor to cancel noise in one or more of the plurality of sub-band signals;

a modifier module stored in the memory and executed by a processor to suppress a noise component and an echo component in the one or more noise canceled sub-band signals on a per sub-band basis; and a reconstructor module stored in the memory and executed by a processor to reconstruct a modified time domain signal from the components suppressed sub-band signals provided by the modifier module.

2. The system of claim 1, wherein the time domain acoustic signals are received from one or more microphone signals on an audio device.

3. The system of claim 1 further comprising a feature extraction module stored in memory and executed by a processor to determine features of the sub-band signals, the features determined for each frame in a series of frames for the acoustic signals.

4. The system of claim 3, the feature extraction module configured to control adaptation of the noise cancellation module or the modifier module based on inter-microphone level difference or inter-microphone time or phase differences between a primary acoustic signal and a second, third or other acoustic signal.

5. The system of claim 1, the noise cancellation module cancelling at least a portion of the plurality of sub-band signals by subtracting the noise component or by subtracting the echo component from the one or more of the plurality of sub-band signals.

6. The system of claim 5, further comprising:

a feature extraction module stored in memory and executed by a processor to receive the plurality of sub-band signals from the frequency analysis module, and determine features of each of the plurality of the sub-band signals, the features determined for each frame in a series of frames for the acoustic signals, wherein a determined feature is a null-processing inter-microphone level difference derived in the feature extraction module from output of the one or more noise canceled sub-band signals from the noise cancellation module and from the plurality of received sub-band signals.

7. The system of claim 1, further comprising a mask generator module stored in memory and executed by the processor to generate a mask, the mask configured to be applied by the modifier module to sub-band signals output by the noise cancellation module.

8. The system of claim 7, further comprising:

a feature extraction module stored in memory and executed by a processor to determine features of the sub-band signals, the features determined for each frame in a series of frames for the acoustic signals, wherein the mask is determined based partly upon one or more features derived in the feature extraction module.

9. The system of claim 8, wherein the mask is determined based at least in part on a threshold level of speech-loss distortion, a desired level of noise or echo suppression, or an estimated signal to noise ratio in each sub-band of the sub-band signals.

10. A method for performing noise reduction in an audio signal, the method comprising:

executing a stored frequency analysis module by a processor to generate sub-band signals in a frequency domain from time domain acoustic signals;

executing a noise cancellation module by a processor to cancel at least a portion of the sub-band signals;

executing a modifier module by a processor to suppress a noise component and an echo component in the noise canceled portion of the sub-band signals on a per sub-band basis; and executing a reconstructor module by a processor to reconstruct a modified time domain signal from the components suppressed sub-band signals provided by the modifier module.

11. The method of claim 10, further comprising receiving time domain acoustic signals from one or more microphone signals on an audio device.

12. The method of claim 10, further comprising determining features of the sub-band signals, the features determined for each frame in a series of frames for the acoustic signals.

13. The method of claim 12, further comprising controlling adaptation of the noise cancellation module or the modifier module based on inter-microphone level difference or inter-microphone time or phase differences between a primary acoustic signal and a second, third or other acoustic signal.

14. The method of claim 10, further comprising:

determining features of the sub-band signals, the features determined for each frame in a series of frames for the acoustic signals, wherein a feature is derived in a feature extraction module from output of the noise cancellation module and from the canceled portion of the sub-band signals.

15. The method of claim 10, further comprising generating a mask, the mask configured to be applied by the modifier module to sub-band signals output by the noise cancellation module.

16. The method of claim 15, further comprising:

determining features of the sub-band signals, the features determined for each frame in a series of frames for the acoustic signals, wherein the mask is determined based partly upon one or more features derived in a feature extraction module.

17. The method of claim 16, wherein the mask is determined based at least in part on a threshold level of speech-loss distortion, a desired level of noise or echo suppression, or an estimated signal to noise ratio in each sub-band of the sub-band signals.

18. A non-transitory computer readable storage medium having embodied thereon a program, the program being executable by a processor to perform a method for reducing noise in an audio signal, the method comprising:

executing a stored frequency analysis module by a processor to generate a plurality of sub-band signals in a frequency domain from time domain acoustic signals;

executing a noise cancellation module by a processor to cancel noise in one or more of the plurality of sub-band signals;

executing a modifier module by a processor to suppress a noise component and an echo component in the one or more noise canceled sub-band signals on a per sub-band basis; and executing a reconstructor module by a processor to reconstruct a modified time domain signal from the components suppressed sub-band signals provided by the modifier module.

* * * * *